(12) United States Patent
Gupta et al.

(10) Patent No.: US 9,411,741 B2
(45) Date of Patent: Aug. 9, 2016

(54) SYSTEM AND METHOD FOR APPLICATION LEVEL CACHING

(71) Applicants: Munish Kumar Gupta, Bangalore (IN); Aravind Ajad Yarra, Bangalore (IN)

(72) Inventors: Munish Kumar Gupta, Bangalore (IN); Aravind Ajad Yarra, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 282 days.

(21) Appl. No.: 14/030,193

(22) Filed: Sep. 18, 2013

(65) Prior Publication Data

US 2015/0032966 A1      Jan. 29, 2015

(30) Foreign Application Priority Data

Jul. 29, 2013  (IN) .......................... 3361/CHE/2013

(51) Int. Cl.
  *G06F 12/08*  (2016.01)
  *G06F 12/12*  (2016.01)
(52) U.S. Cl.
  CPC .......... *G06F 12/0891* (2013.01); *G06F 12/121* (2013.01)
(58) Field of Classification Search
  None
  See application file for complete search history.

(56) References Cited

U.S. PATENT DOCUMENTS

| 7,249,288 | B2 | 7/2007 | Peled et al. | |
| 8,322,844 | B2 | 12/2012 | Toya | |
| 2006/0248276 | A1* | 11/2006 | Kilian | G06F 12/0831 711/130 |
| 2007/0124541 | A1* | 5/2007 | Lang | G06F 12/0862 711/137 |
| 2012/0042065 | A1 | 2/2012 | Takahashi | |
| 2012/0297144 | A1* | 11/2012 | Gill | G06F 12/0862 711/137 |
| 2013/0013729 | A1* | 1/2013 | Bennett | H04L 67/2842 709/217 |

OTHER PUBLICATIONS

R. Rao et al., "Non-invasive Caching using AOP," http://slashdevslashzero.files.wordpress.com/2011/01/cachingusingaop_article_v0-2.pdf (Jan. 2011).

* cited by examiner

*Primary Examiner* — Daniel Tsui
(74) *Attorney, Agent, or Firm* — Finnegan, Henderson, Farabow, Garrett & Dunner, L.L.P.

(57) ABSTRACT

The disclosure generally relates to methods and systems for application level caching and more particularly to dynamically applying caching policies to a software application. In one embodiment, an application level caching method, comprising: monitoring, using a utility executed by a processor, run-time data access operations corresponding to an application; identifying, using the processor, at least one characteristic associated with the run-time data access operations; triggering, using the processor, a caching rule based on the at least one characteristic associated with the run-time data access operations; and providing, using the processor, a memory access instruction according to the caching rule.

21 Claims, 2 Drawing Sheets

SYSTEM AND METHOD FOR APPLICATION LEVEL CACHING

TECHNICAL FIELD

The disclosure relates generally to methods and systems for application level caching, and more particularly to dynamically applying caching policies to a software application.

BACKGROUND

Software applications running on a computing device require accessing data stored in a data store, which may be a part of the computing device or may be connected to the computing device over a network. To increase processing efficiency while accessing the required data, data can be cached. In caching, an application checks for required data in a cache, which can be accessed faster than the data store of the computing device, before accessing the data store. If the required data exists in the cache, which is referred to as a "cache hit," the application accesses that data from the cache. If the data does not exist in the cache, which is referred to as a "cache miss", the application accesses that data from the data store and optionally, caches the data for subsequent use.

Usually, caching of data associated with an application is implemented in an original code of the application. The logic behind the caching is determined at the time of developing the application. If the caching logic needs to be modified or a new caching logic needs to be introduced at a later stage due to various requirements, the original code needs to be modified accordingly. For example, a developer of the application may have to modify the existing caching logic or include additional code for implementing the new caching logic and include that additional code in the original code.

Each time caching is implemented for the application, the application code must be modified and the re-compiled application tested again before it is deployed for practical use. Further, during the run time of the application, if anomalies are found in the application behavior, the application code must be fixed and the application tested again before being redeployed. In addition, because it is difficult to predict the changing caching needs of the application in advance, an analysis of the changing cache pattern needs to be done and the application code needs to be recompiled every time changes in caching patterns are encountered. This further leads to multiple code modification and testing cycles.

SUMMARY

In one embodiment, an application level caching method is disclosed, comprising: monitoring, using a utility executed by a processor, run-time data access operations corresponding to an application; identifying, using the processor, at least one characteristic associated with the run-time data access operations; triggering, using the processor, a caching rule based on the at least one characteristic associated with the run-time data access operations; and providing, using the processor, a memory access instruction according to the caching rule.

In one embodiment, an application level caching system is disclosed, comprising: a processor; and a memory disposed in communication with the processor and storing processor-executable instructions, the instructions comprising instructions to: monitor, using a utility executed by the processor, run-time data access operations corresponding to an application; identify at least one characteristic associated with the run-time data access operations; trigger a caching rule based on the at least one characteristic associated with the run-time data access operations; and provide a memory access instruction according to the caching rule.

A non-transitory computer readable medium is disclosed, having stored thereon computer-executable application level caching instructions, the instructions comprising instructions for: monitoring, using a utility executed by a processor, run-time data access operations corresponding to an application; identifying at least one characteristic associated with the run-time data access operations; triggering a caching rule based on the at least one characteristic associated with the run-time data access operations; and providing a memory access instruction according to the caching rule.

DETAILED DESCRIPTION

Now, exemplary embodiments of the present disclosure will be described with reference to the accompanying drawings. Wherever possible, the same reference numbers will be used throughout the drawings to refer to the same or like parts. While exemplary embodiments and features are described herein, modifications, adaptations, and other implementations are possible, without departing from the spirit and scope of the disclosure. Accordingly, the following detailed description does not limit the subject matter. Instead, the proper scope of the subject matter is defined by the appended claims.

Figure 1:
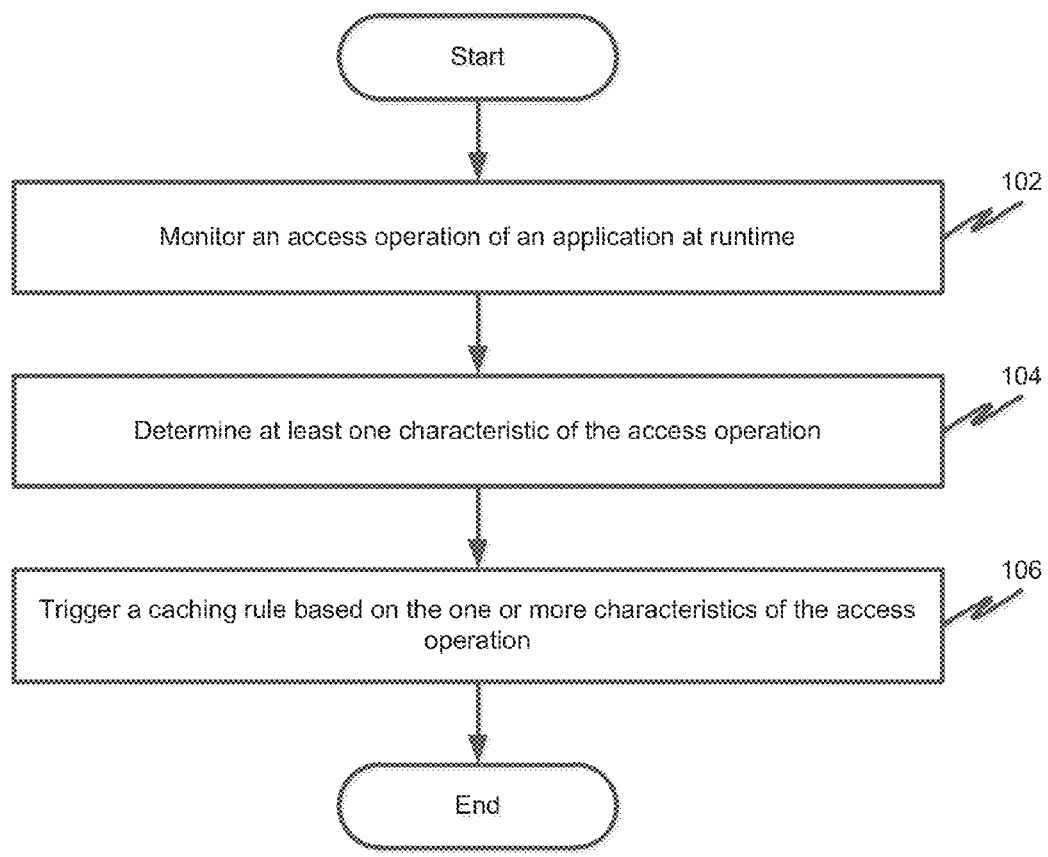
FIG. 1 illustrates a flowchart of a method of dynamically applying caching policies in accordance with some embodiments.

FIG. 1 illustrates a flowchart of a method of dynamically applying caching rules to a software application running on a computing device. The computing device may be a tablet, a desktop computer, a mobile phone, a personal digital assistant (PDA), or any other electronic device that has computing capabilities to run a software application. The computing device may include a processor, a data store, a cache memory, and a cache rules store.

In some embodiments, the data store may include a storage database where data associated with one or more application codes may be stored. The data store may be implemented as a part of the computing device or as a separate entity that is connected to the computing device over a network. In some embodiments, the cache memory may be implemented as part of a random access memory (RAM) of the computing device for faster access to data that is cached. Further, the cache rules store may be implemented as a part of the data store in the computing device or as a separately from the data store.

At step 102, a utility executed by the processor may monitor one or more run-time data access operations of the application. For purposes of this disclosure, run-time may include any instance that the application is executed. The data access operations may include operations involving the application code accessing the data store. The data access operations may include a code line accessing memory, a callable unit accessing memory, a callable unit accessing another callable unit etc. For purposes of this disclosure, a callable unit may include a subroutine, a function, a method, etc. Further, the term "access" in this disclosure includes reading data from a memory (such as the data store or cache), or writing data to the memory, or both, simultaneously or otherwise. Here, a memory such as the data store may be a part of the computing device or may be connected to the computing device over a network. Thus, the term "access" may encompass read or write operations that occur internally in the computing device (reading/writing data to or from an internal data store) or over a network (reading/writing data to or from a data store connected to the computing device over the network).

One or more utilities or agents executed by the processor may monitor the data access operations. Utilities or agents may be small compiled logic components that add a trace identification number to a data access operation to monitor one or more parameters associated with that data access operation.

Monitoring the run-time data access operations may include monitoring various parameters associated with data access operations when the application is run. The processor may monitor the parameters associated with all the data access operations in a chronological order. The parameters that may be monitored include, without limitation, data accessed by a data access operation (e.g., by monitoring which application variables correspond to the accessed data), memory addresses accessed by the data access operation, amount of data accessed during the data access operation, cycle time of the access operation, that is, time between the invocation of the access operation and returning the data to the calling data access operation for processing, processor utilization etc. Additionally, dependencies between the access operation and other callable units invoked when the access operation occurs, processing cost associated with the data access operation (e.g., computation time, computation energy consumption, number of clock cycles, number of processing threads, number of processors involved in the computation, or combinations thereof), the input and the output of the callable unit associated with the access operation, etc. may be monitored. In addition, in some embodiments, a time stamp may be associated with each activity of an access operation to determine when the access operation occurs and if there are any patterns associated with the access operation with respect to time of day (or relative time with reference to a time marker, e.g., initial deployment of application).

The processor may maintain a log of the monitored access operations. The log may include a list of the monitored access operations and time stamps associated with each of the monitored data access operations. The log may also include the monitored parameters associated with each of the data access operations. Thus, the log may present an overall listing of events related to the data access operations occurring over a period of time. For example, a log entry may be of the form:

$t_0$—accessoperation$_1$ called <determine_average_value>, where $t_0$ indicates the time at which accessoperation$_1$ called a subroutine <determine_average_value>. Similarly, the log may indicate individual instances of access operations accessing the data store, how much data was accessed in each of these instances, time taken to perform the access operation, processor utilization, etc. Thus, the log may provide a complete view of the various memory accesses performed by the application.

On monitoring the data access operation, the utility may identify one or more characteristics of the monitored data access operation at step 104. The processor may identify the characteristics by using the log that includes the parameters associated with the monitored data access operations. The one or more characteristics may include frequency of a data access operation, memory addresses accessed by a data access operation, and dependencies associated with a data access operation, that is, other callable units that are invoked whenever the data access operation occurs. The one or more characteristics may further include amount of data accessed during a data access operation, cycle time of a data access operation, and processing cost associated with a data access operation. In addition, the one or more characteristics may include a correlation between the input to the output of a callable unit associated with a data access operation, that is, determining whether the callable unit provides the same output for a given input every time the callable unit is invoked, and correlation of the access operation to the total number of data access operations occurring during a period of time.

In some embodiments, the characteristic of a data access operation may be determined by aggregating all instances of a particular kind of access operation. For example, in keeping with the previous example, the number of accesses of the access operation <accessoperation$_1$> to access the subroutine <determine_average_value> may be determined by counting each such individual log entry. A high number of accesses of the subroutine <determine_average_value> by <accessoperation$_1$> or any other access operation may indicate that the subroutine <determine_average_value> is frequently accessed and may be a potential candidate for caching. In this case, the high number of accesses to the subroutine <determine_average_value> may be considered characteristic of <accessoperation$_1$>. In another example, based on the log entries over a period of time, it may be determined that an <accessoperation$_2$> accesses particular data every day at a certain time. For example, a banking application may access the previous day's closing balance every day at the start of the business day so that adjustments for the current day may be made accordingly. In this case, the repeated access of the closing balance at the start of each business day may be considered a characteristic of <accessoperation$_2$>. In another example, the processor utilization of an <accessoperation$_3$> over a period of time may be determined to be substantially higher than all other access operations. Thus, high processor utilization may be identified as a characteristic of <accessoperation$_3$> and <accessoperation$_3$> may become a potential candidate for caching.

Thus, the characteristics for individual data access operations may be identified from the monitored parameters for each data access operation. The processor may identify any of the other mentioned characteristics by using the monitored parameters associated with the data access operations. The identified characteristics may be stored in the memory of the computing device so that they may be used to define or trigger caching rules.

At step 106, the utility executed by the processor may trigger one or more caching rules based on the one or more characteristics associated with the access operation. In some embodiments, an administrator may predefine caching rules before the application is run for practical purposes. In some embodiments, such rules may also be created during a testing phase of the application before the application is practically deployed. The administrator may randomly create rules before practically deploying the application. Thus, such rules may be considered to be predefined for a run-time execution of the application when it is deployed for the first time.

In some embodiments, an administrator may predefine the caching rules based on the characteristics associated with different data access operations. In accordance with these embodiments, the identified characteristics may be visually displayed to an administrator. Based on the displayed characteristics, the administrator may define rules to implement caching. The identified characteristics of each operation may be displayed along with each data access operation. The administrator may then identify "hotspots" in the application that may cause bottlenecks or delays and may define rules to cache the data accordingly. The rules created by the administrator based on the characteristics of the access operations may be considered to be predefined for any future instances of those access operations.

In some embodiments, caching rules may be automatically generated based on determining the one or more characteristics associated with the access operation. For example, on determining that a number of users accessing an <accessoperation$_2$> to invoke a callable <unit$_2$> of the application exceed a predefined threshold, a new caching rule may be automatically created. The new caching rule may indicate that if the number of users exceeds a second threshold greater than the predefined threshold, the callable <unit$_2$> being called by the users should be cached. Thus, automatically created rules for the access operations may be considered to be predefined for any future instances of the access operations that occur after the characteristics are identified. These rules can be stored in the memory of the computing device such that they can be triggered during the future instances of the access operations.

The caching rules may include cache populating rules, cache replacement rules, and cache eviction rules. Cache populating rules may define rules for caching data that the application needs to access. The cache populating rules may specify, for example, what is to be cached, and also indicate when a particular item or memory line is to be cached. In one example, based on monitoring the access operations, it may be determined that during a time interval 3 PM to 5 PM, an <accessoperation$_1$> occurs repeatedly. Thus a cache populating rule may be triggered to cache a callable <unit$_1$> that is invoked by the <accessoperation$_1$>. Such a cache populating rule may specify that if an access operation occurs repeatedly over a period of time to invoke a callable unit, the callable unit should be cached. In another example, a utility or agent may monitor that an <accessoperation$_2$> invokes a callable <unit$_1$>. It may further be monitored that a callable <unit$_2$> is invoked every time the <accessoperation$_2$> invokes callable <unit$_1$>. Thus, the interdependency between callable <unit$_1$> and callable <unit$_2$> may be identified as a characteristic. Therefore, a cache populating rule that is based on such interdependency may be triggered. Such a rule may indicate that if an access operation is associated with interdependency between two callable units, both the callable units need to be cached.

Cache eviction rules may define rules for removing data from the cache. In an exemplary scenario, a cache eviction rule may define that if a callable method is not called in 4 hours, the callable method may be removed from the cache irrespective of whether the cache is full or not. In another example, if an access operation occurs only between 6:30 PM-7:00 PM in a day, a cache eviction rule may indicate that cached data associated with the access operation needs to be removed after 7:00 PM.

Cache replacement rules may define rules for replacing data in the cache by newer data when the cache is full. In one example of a cache replacement rule, if the cache is full, a cached callable unit that is not called in the past 2 hours may be removed from the cache to accommodate newer data. If there is more than one callable unit satisfying this condition, the callable unit with a larger size can be removed.

However, it should be apparent to a person skilled in the art that caching rules are not limited to these rules and other rules that define rules for addition, eviction, or replacement of data from the cache memory may also be implemented. Other non-limiting examples of cache replacement policies may include a least recently used, most recently used rule, a random replacement rule, and a segmented least recently used rule.

Once a caching rule is triggered, the processor may provide a memory access instruction according to the caching rule. In some embodiments, the memory access instruction may be provided by the processor to a cache management subsystem. The cache management subsystem may then access data from the data store or the cache memory according to the caching rule. In an exemplary scenario, the processor may instruct the cache management subsystem to fetch a callable unit from the data store and cache it on determining that the callable unit is frequently accessed. Similarly, the cache subsystem, based on an instruction by the processor, may remove or replace data from the cache memory if it is determined that the data would not be needed again.

In accordance with some embodiments of this disclosure, the utility or agent may be provided to the application as a plugin or a software update, for example, to execute either one or more of the steps of the flow chart of FIG. 1. Once the application is updated by the agent, caching rules may be triggered based on the identified characteristics of the application.

In the discussed embodiments, because agents are used as utilities by the processor to execute one or more of the steps of the flowchart of FIG. 1, the code of the application does not need to be modified to implement caching. Thus, caching is implemented for the application in a non-intrusive way, that is, without modifying the original code of the application.

Figure 2:
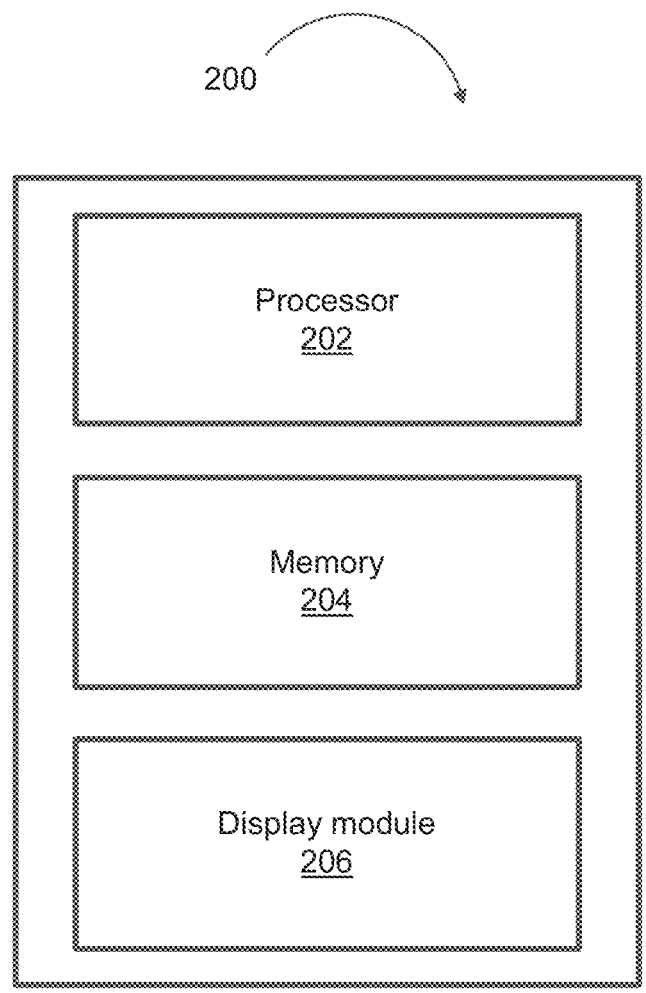
FIG. 2 illustrates a block diagram of a system for dynamically applying caching policies in accordance with some embodiments.

FIG. 2 illustrates an application level caching system 200 for dynamically applying caching rules for a software application. Application level caching system 200 may include a processor 202 and a memory 204.

When a callable unit of an application code is invoked, the application may access data associated with that callable unit from a data store through an access operation. In some embodiments, the data store may be implemented as a part of memory 204. In an example, if a callable unit such as a method of addition of the first two prime numbers is invoked in a mathematical application, the application may access the callable unit—method of addition and the data associated with the callable unit—first two prime numbers "2" and "3" from memory 204. Subsequently, the callable unit and the data associated with the callable unit may be cached.

Processor 202 may execute one or more utilities or agents to monitor one or more access operations of the application at run time. Utilities or agents may include small compiled logic components that may add a trace identification number to an access operation to monitor one or more parameters associated with that data access operation as described in detail in conjunction with FIG. 1. The various activities of a data access operation may be maintained as a log along with a time stamp to indicate what activities associated with the access operation occurred at what time.

Once the parameters associated with the data access operations are monitored, a utility executed by processor 202 may then identify one or more characteristics of a monitored access operation. Processor 202 may identify the characteristics by aggregating all instances of a particular kind of access operation. All the parameters associated with each data access operation are aggregated from the overall data of all the monitored access operations in the log. The identified characteristics may be stored in memory 204 of the computing device so that they may be used to define or trigger caching rules. Various examples of such characteristics are already discussed above in the context of FIG. 1.

Subsequently, a utility executed by processor 202 may trigger one or more caching rules based on identifying the one or more characteristics associated with the access operation. In some embodiments, the caching rules may be predefined by an administrator before the application is run for practical purposes. In some embodiments, such rules may also be created during a testing phase of the application before the application is practically deployed. The administrator may randomly create rules before practically deploying the application. Thus, such rules may be considered to be predefined for a run-time execution of the application when it is deployed for the first time.

In some other embodiments, caching rules may be created by the administrator based on a visual representation of run-time characteristics of various data access operations of the application. The characteristics may be displayed on a computer screen of application level caching system 200 by a display module 206 of application level caching system 200. The administrator may then identify "hotspots" in the application that may cause bottlenecks or delays and may define rules to cache the data accordingly. Thus, these rules may be considered to be predefined for future instances of running the application that occur after the characteristics are identified. In some embodiments, caching rules may be automatically generated based on determining the one or more characteristics associated with the access operation. These rules may be considered to be predefined for any future instances of these access operations that occur after the characteristics are identified. These rules may be stored in memory 204 such that they can be triggered during the future instances of the access operations.

Such caching rules may include cache populating rules for caching a callable unit or data associated with the callable unit. Caching rules may further include cache eviction rules for removing data from the cache memory irrespective of whether the cache is full or not. Caching rules may also include cache replacement rules for replacing the data in the cache when the cache is full. Examples of such caching rules are discussed above in the context of FIG. 1.

Once a caching rule is triggered, a utility executed by the processor may provide a memory access instruction according to the caching rule. In some embodiments, the memory access instruction may be provided to a cache management subsystem (not shown) as required by the caching rule. In an exemplary scenario, the processor may instruct the cache management subsystem to fetch a callable unit from the data store and cache it on determining that the callable unit is frequently accessed. Similarly, the cache management subsystem, based on an instruction by the processor, may remove or replace data from the cache memory if it is determined that the data would not be needed again.

Some embodiments of this disclosure provides a number of advantages including methods, non-transitory computer readable media, and systems that effectively enable dynamically applying caching rules to a software application. By using agents or utilities to monitor the run-time access operations, identify characteristics of the access operations, and/or triggering caching rules based on those characteristics, caching is implemented in a non-intrusive way for the application. Thus, in such embodiments, the code of the application does not need to be modified to implement caching. This prevents increasing the complexity of the code of the application.

It should be understood that the apparatuses and devices of the embodiments described herein are for exemplary purposes, as many variations of the specific hardware and software used to implement the embodiments are possible, as will be appreciated by those skilled in the relevant art(s).

Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

The embodiments may also be embodied as one or more non-transitory computer readable media having instructions stored thereon for one or more aspects of the present disclosure as described and illustrated by way of the embodiments herein, as described herein, which when executed by a processor, cause the processor to carry out the steps necessary to implement the methods of the embodiments, as described and illustrated herein.

Having thus described the basic concept of the disclosure, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosure. Additionally, the recited order of processing elements or sequences, or the use of numbers, letters, or other designations therefore, is not intended to limit the claimed processes to any order except as may be specified in the claims. Accordingly, the disclosure is limited only by the following claims and equivalents thereto.

What is claimed is:

1. An application level caching method, comprising:
monitoring, using a utility executed by a processor of a computing device, run-time data access operations corresponding to an application, wherein monitoring the run-time data access operations includes monitoring an amount of data accessed during each of the run-time data access operations, a cycle time of each of the run-time data access operations, an input and output of a callable unit associated with the run-time data access operations, and a time stamp associated with each of the run-time data access operations;
identifying, using the processor, at least one characteristic associated with the run-time data access operations, wherein identifying the at least one characteristic includes identifying a correlation between an input and an output of a callable unit associated with the run-time data access operations and identifying a correlation between a number of the run-time data access operations and a period of time during a day;
triggering, using the processor, a caching rule based on the at least one characteristic associated with the run-time data access operations;
providing, using the processor, a memory access instruction to a cache management subsystem of the computing device according to the caching rule; and
fetching, based on the memory access instruction and by the cache management subsystem, data from an internal data store of the computing device to a cache memory of the computing device.

2. The method of claim 1, wherein the caching rule comprises at least one of: a cache populating rule, a cache replacement rule, and a cache eviction rule.

3. The method of claim 1, wherein the caching rule is automatically generated based on the at least one characteristic associated with the run-time data access operations.

4. The method of claim 3, further comprising: storing the automatically generated caching rule.

5. The method of claim 1, wherein the caching rule is pre-defined by an administrator.

6. The method of claim 1, further comprising: visually representing, using a display unit operably connected to the processor, the at least one characteristic associated with the run-time data access operations.

7. The method of claim 1, further comprising: storing data identifying the at least one characteristic associated with the run-time data access operations.

8. An application level caching system comprising:
a processor; and
a memory disposed in communication with the processor and storing processor-executable instructions, the instructions comprising instructions to:
monitor, using a utility executed by the processor, run-time data access operations corresponding to an application, wherein monitoring the run-time data access operations includes monitoring an amount of data accessed during each of the run-time data access operations, a cycle time of each of the run-time data access operations, an input and output of a callable unit associated with the run-time data access operations, and a time stamp associated with each of the run-time data access operations;
identify at least one characteristic associated with the run-time data access operations, wherein identifying the at least one characteristic includes identifying a correlation between an input and an output of a callable unit associated with the run-time data access operations and identifying a correlation between a number of the run-time data access operations and a period of time during a day;
trigger a caching rule based on the at least one characteristic associated with the run-time data access operations;
provide a memory access instruction to a cache management subsystem of a computing device according to the caching rule; and
cause the cache management subsystem to fetch, based on the memory access instruction, data from an internal data store of the computing device to a cache memory of the computing device.

9. The system of claim 8, wherein the caching rule comprises at least one of: a cache populating rule, a cache replacement rule, and a cache eviction rule.

10. The system of claim 8, wherein the caching rule is automatically generated based on the at least one characteristic associated with the run-time data access operations.

11. The system of claim 10, further comprising: storing the automatically generated caching rule.

12. The system of claim 8, wherein the caching rule is pre-defined by an administrator.

13. The system of claim 8, further comprising: a display module configured to visually represent the at least one characteristic associated with the run-time data access operations.

14. The system of claim 8, the instructions further comprising instructions to: store the at least one characteristic associated with the run-time data access operations.

15. A non-transitory computer readable medium having stored thereon computer-executable application level caching instructions, the instructions comprising instructions for:
monitoring, using a utility executed by a processor of a computing device, run-time data access operations corresponding to an application, wherein monitoring the run-time data access operations includes monitoring an amount of data accessed during each of the run-time data access operations, a cycle time of each of the run-time data access operations, an input and output of a callable unit associated with the run-time data access operations, and a time stamp associated with each of the run-time data access operations;
identifying at least one characteristic associated with the run-time data access operations, wherein identifying the at least one characteristic includes identifying a correlation between an input and an output of a callable unit associated with the run-time data access operations and identifying a correlation between a number of the run-time data access operations and a period of time during a day;
triggering a caching rule based on the at least one characteristic associated with the run-time data access operations;
providing a memory access instruction to a cache management subsystem of the computing device according to the caching rule; and
causing the cache management subsystem to fetch, based on the memory access instruction, data from an internal data store of the computing device to a cache memory of the computing device.

16. The medium of claim 15, wherein the caching rule comprises at least one of: a cache populating rule, a cache replacement rule, and a cache eviction rule.

17. The medium of claim 15, the instructions further comprising instructions for: automatically generating the caching rule based on the at least one characteristic associated with the run-time data access operations.

18. The medium of claim 17, the instructions further comprising instructions for: storing the automatically generated caching rule.

19. The medium of claim 15, wherein the caching rule is pre-defined by an administrator.

20. The medium of claim 15, the instructions further comprising instructions for: visually representing the at least one characteristic associated with the run-time data access operations.

21. The medium of claim 15, the instructions further comprising instructions for: storing the at least one characteristic associated with the run-time data access operations.

* * * * *